(12) United States Patent
Furukawa et al.

(10) Patent No.: US 8,732,454 B2
(45) Date of Patent: May 20, 2014

(54) KEY SETTING METHOD, NODE, AND NETWORK SYSTEM

(71) Applicant: Fujitsu Limited, Kawasaki (JP)

(72) Inventors: Kazuyoshi Furukawa, Kawasaki (JP);
Hisashi Kojima, Yokosuka (JP);
Masahiko Takenaka, Kawasaki (JP);
Tetsuya Izu, Ichikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/747,742

(22) Filed: Jan. 23, 2013

(65) Prior Publication Data

US 2013/0138949 A1     May 30, 2013

Related U.S. Application Data

(63) Continuation of application No. PCT/JP2010/062713, filed on Jul. 28, 2010.

(51) Int. Cl.
*H04L 9/00*     (2006.01)

(52) U.S. Cl.
USPC .......................................... 713/153; 713/171

(58) Field of Classification Search
USPC ................ 713/153, 160, 168, 171; 726/3, 12; 380/44, 247, 255
See application file for complete search history.

(56) References Cited

U.S. PATENT DOCUMENTS

| | | | | |
|---|---|---|---|---|
| 7,714,735 B2 * | 5/2010 | Rockwell | ................ | 340/635 |
| 8,138,934 B2 * | 3/2012 | Veillette et al. | ................ | 340/635 |
| 8,144,596 B2 * | 3/2012 | Veillette | ................ | 370/238 |
| 8,397,288 B2 * | 3/2013 | Melvin et al. | ................ | 726/15 |
| 2005/0144437 A1 * | 6/2005 | Ransom et al. | ................ | 713/151 |
| 2007/0064950 A1 | 3/2007 | Suzuki et al. | | |
| 2010/0317420 A1 * | 12/2010 | Hoffberg | ................ | 463/1 |
| 2011/0176681 A1 * | 7/2011 | Yamada et al. | ................ | 380/281 |
| 2012/0054852 A1 * | 3/2012 | Gibbs et al. | ................ | 726/15 |

FOREIGN PATENT DOCUMENTS

| | | |
|---|---|---|
| JP | 2003-348072 | 12/2003 |
| JP | 2005-303449 | 10/2005 |
| JP | 2007-88799 | 4/2007 |
| JP | 2009-81854 | 4/2009 |
| WO | WO 2010/044292 | 4/2010 |

OTHER PUBLICATIONS

International Search Report of PCT/JP2010/062713 mailed Oct. 26, 2010.

* cited by examiner

*Primary Examiner* — Samson Lemma

(74) *Attorney, Agent, or Firm* — Staas & Halsey LLP

(57) ABSTRACT

A key setting method executed by a node transmitting and receiving a packet through multi-hop communication in an ad-hoc network among ad-hoc networks, includes receiving a packet encrypted using a key specific to a gateway and simultaneously reported from the gateway in the ad-hoc network; detecting a connection with a mobile terminal capable of communicating with a server retaining a key specific to a gateway in each ad-hoc network among the ad-hoc networks; transmitting to the server, via the mobile terminal and when a connection with the mobile terminal is detected, the encrypted packet received; receiving from the server and via the mobile terminal, a key specific to a gateway in the ad-hoc network and for decrypting the encrypted packet transmitted; and setting the received key specific to the gateway in the ad-hoc network as the key for encrypting the packet.

7 Claims, 15 Drawing Sheets

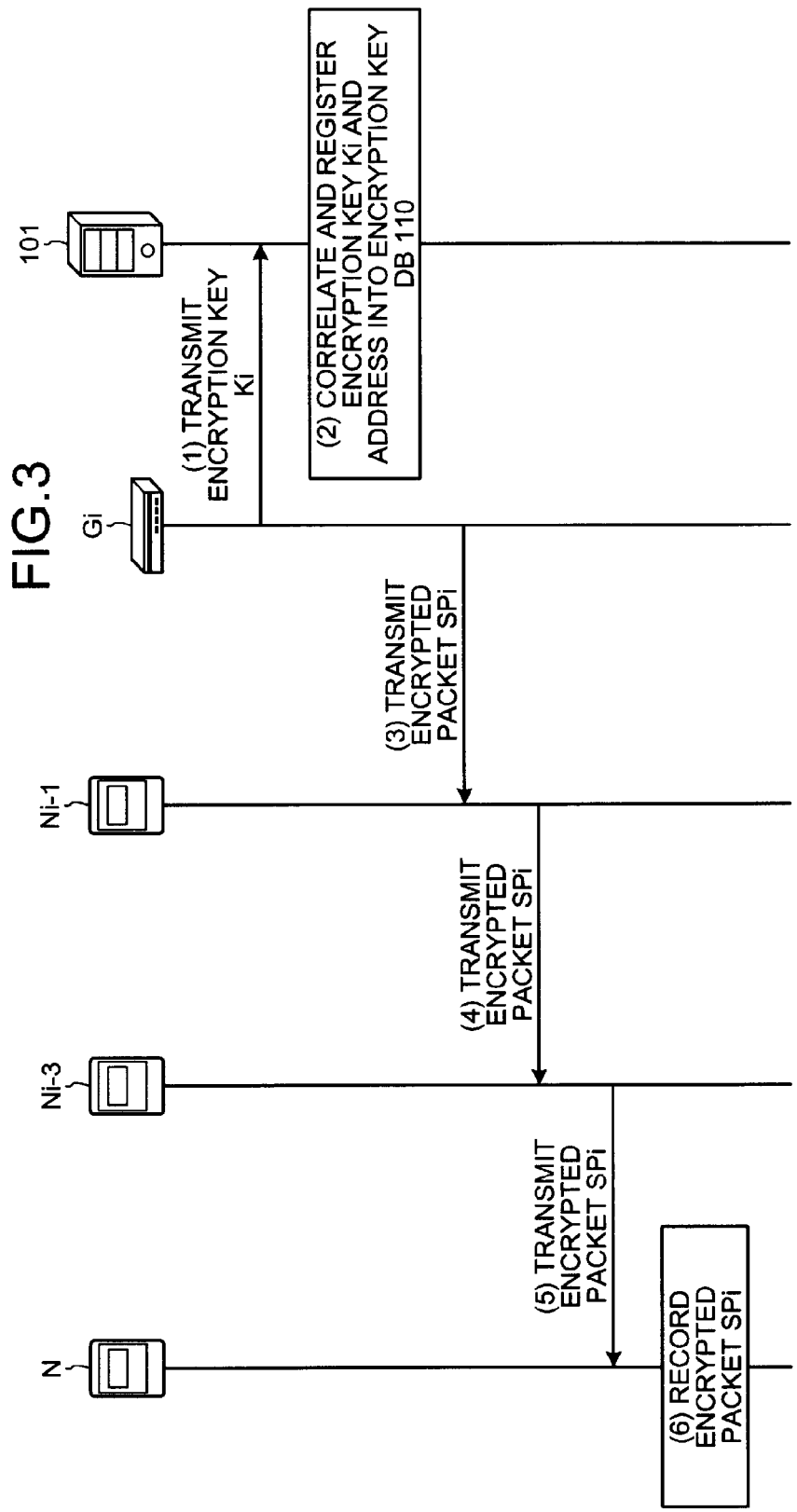

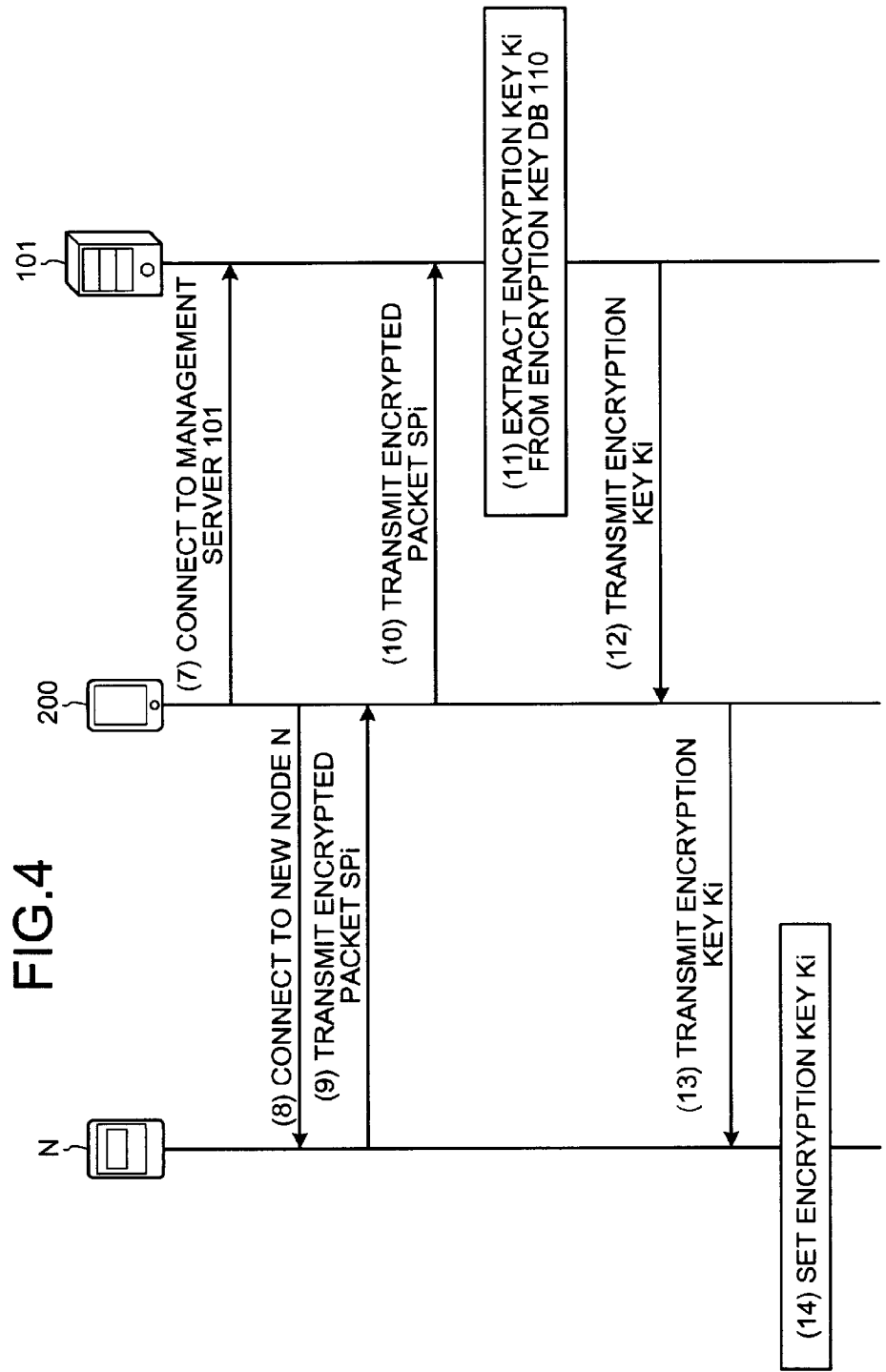

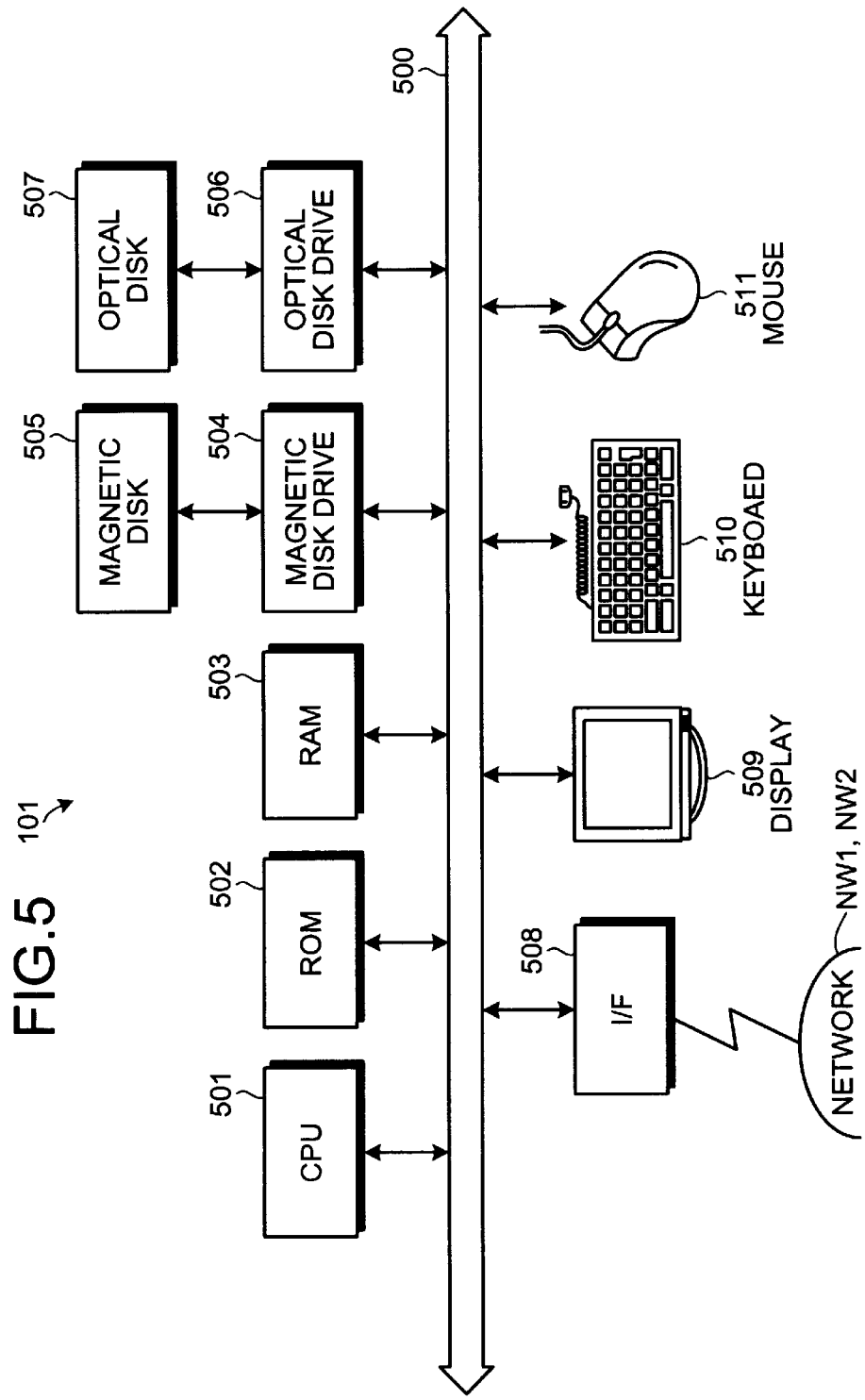

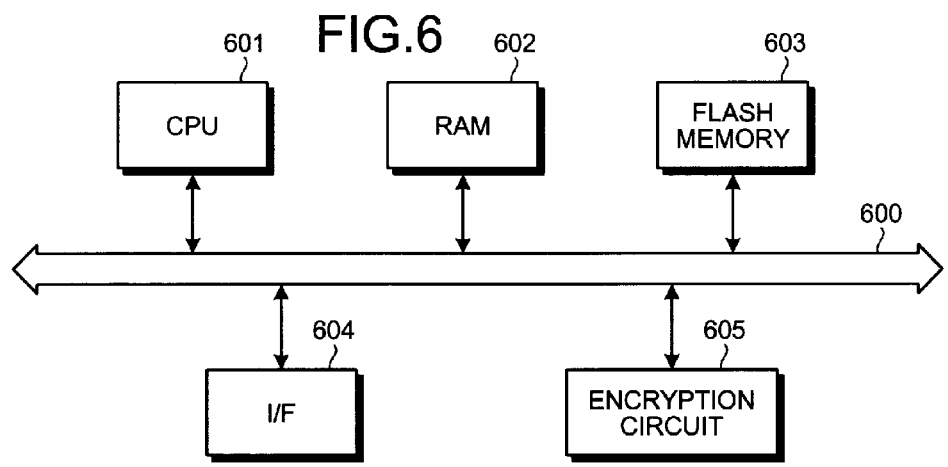
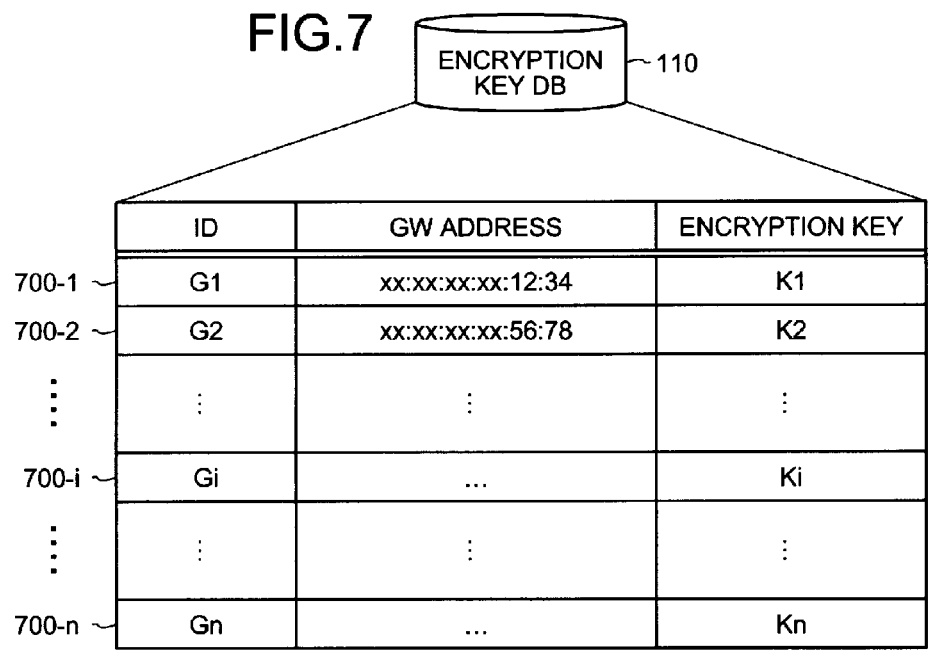

PACKET INFORMATION TABLE ~1000

| ID | HOP NUMBER | GW ADDRESS |
|---|---|---|
| SP1 | 10 | xx:xx:xx:xx:12:34 |
| SP2 | 8 | xx:xx:xx:xx:56:78 |
| SP1 | 7 | xx:xx:xx:xx:12:34 |
| SP2 | 6 | xx:xx:xx:xx:56:78 |
| SP1 | 1 | xx:xx:xx:xx:12:34 |

1000-1 — (row 1)
1000-5 — (row 5)

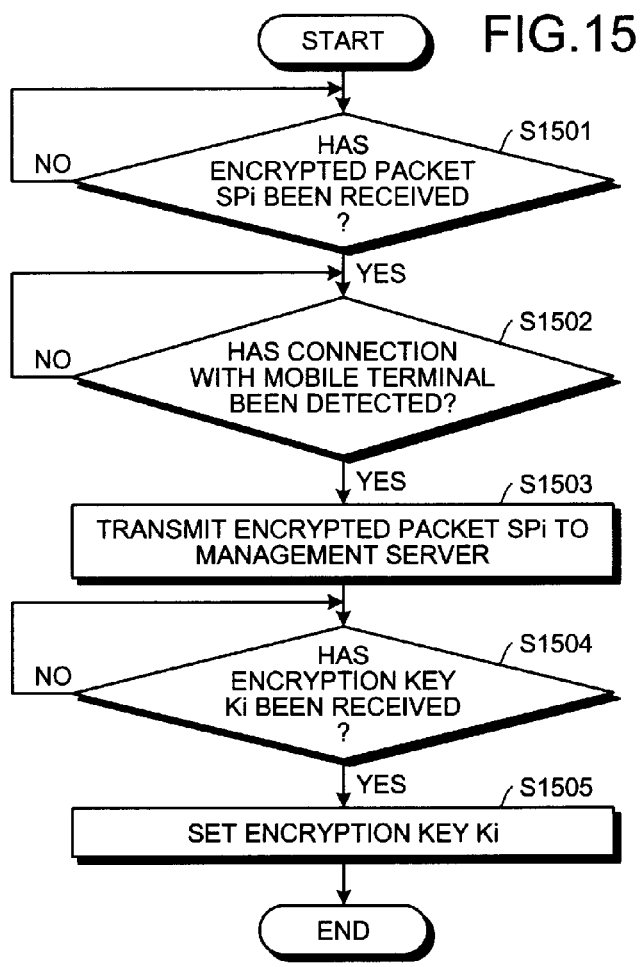

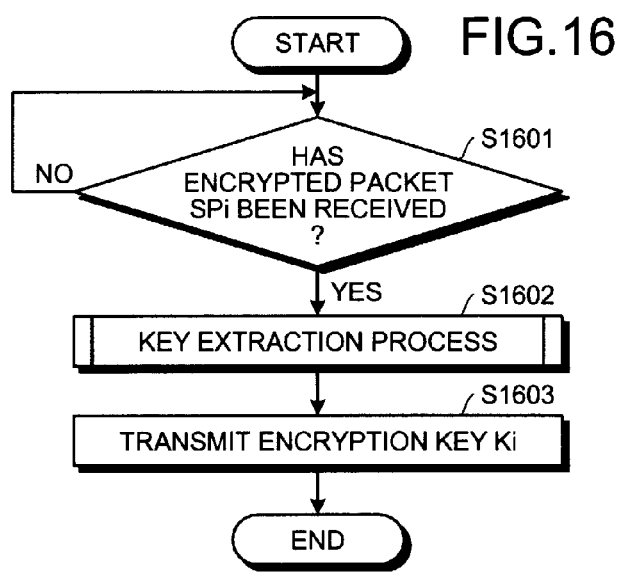

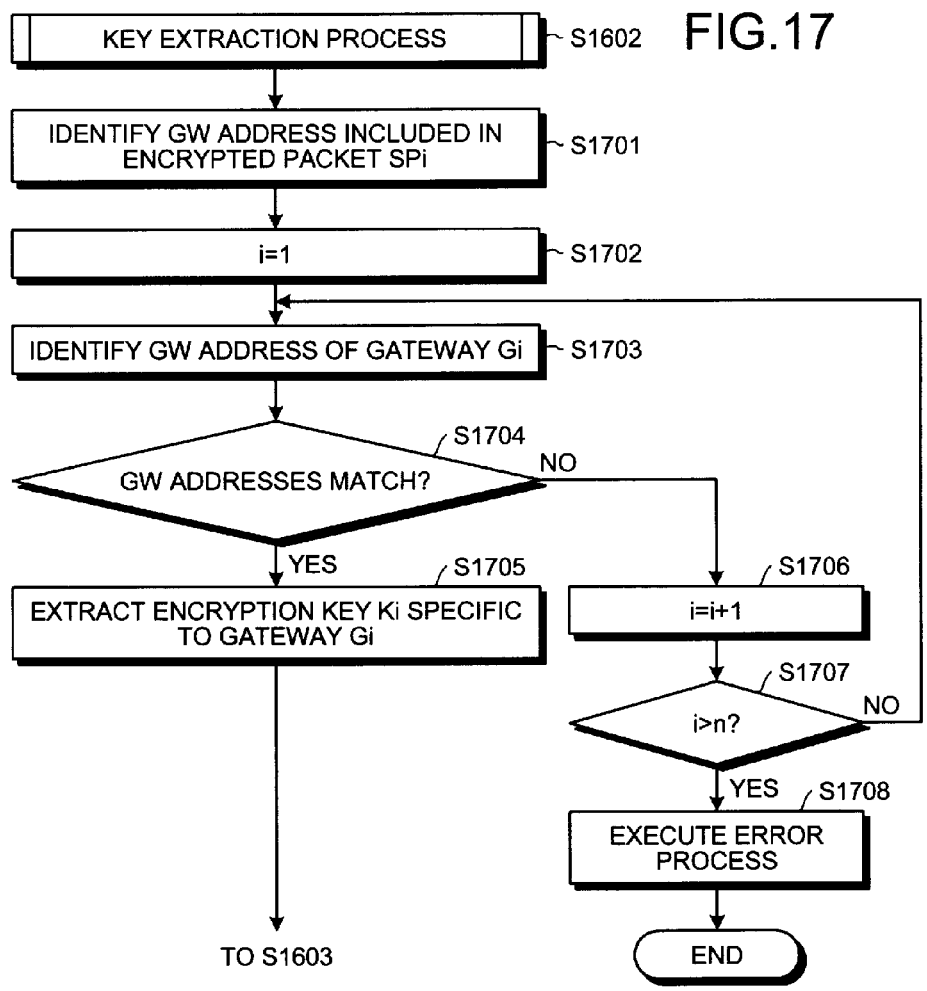

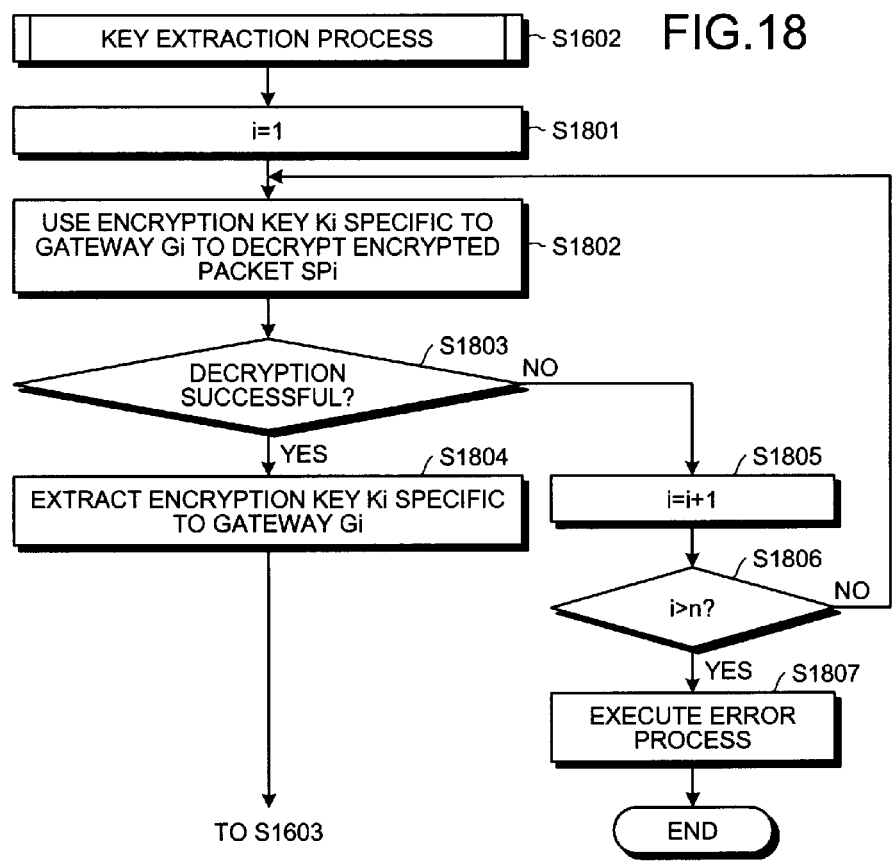

KEY SETTING METHOD, NODE, AND NETWORK SYSTEM

CROSS REFERENCE TO RELATED APPLICATIONS

This application is a continuation application of International Application PCT/JP2010/062713, filed on Jul. 28, 2010 and designating the U.S., the entire contents of which are incorporated herein by reference.

FIELD

The embodiment discussed herein is related to a key setting method, a node, and a network system that set a key for encrypting data.

BACKGROUND

An ad-hoc network is a kind of a self-configuring network linked through radio communication. The ad-hoc network is made up of multiple nodes. The nodes in the ad-hoc network transmit and receive packets through multi-hop communication. Multi-hop communication is a technique enabling nodes that not present in one another's communication area to communicate, via other nodes present in the communication areas of the nodes.

If an ad-hoc network is connected to another network such as the Internet, a local area network (LAN), and a wide area network (WAN), a relay device called gateway is used to transfer communication between networks.

Technology utilizing an ad-hoc network includes a system that incorporates a node capable of radio communication with an electricity meter at a household to perform operations such as checking the meter through the ad-hoc network without actually going to the site. An ad-hoc network handling personal information such as electricity usage of each household is required to perform secure communication with respect to confidentiality and tampering prevention.

Therefore, conventional systems encrypt packets transmitted and received between nodes in an ad-hoc network to ensure secure communication. In this case, use of an encryption key common to all the nodes in the system poses a greater risk if the key is compromised and therefore, some systems change the encryption key for each gateway.

At the time of initial introduction, etc. of a new node into a system, the new node cannot perform secure communication with other nodes in an ad-hoc network until an encryption key is set. Therefore, it is difficult to automatically set an encryption key for the new node through the ad-hoc network and an operator has to actually go to the site to set an encryption key.

Prior arts related to secure communication include, for example, a technique of managing an encryption key of a network in which communication is performed by broadcasting (see, e.g., Japanese Laid-Open Patent Publication No. 2003-348072); a technique for stably executing key exchange at the start of communication in an ad-hoc network (see, e.g., Japanese Laid-Open Patent Publication No. 2007-88799); and a technique for allowing each node in an ad-hoc network to select an adaptive gateway (see, e.g., Japanese Laid-Open Patent Publication No. 2009-81854).

However, if the encryption key set for nodes in an ad-hoc network is changed for each gateway, the conventional techniques have a problem in that it is difficult to identify the gateway to which a new node belongs at the time of initial introduction, etc. of the new node. For example, even if a candidate gateway can be narrowed down by the address of the location of a new node, the communication status changes due to factors such as weather and a positional relationship with nearby buildings. Therefore, an operator must actually go on-site to confirm which gateway is communicable, arising in a problem in that the work hours of the operator and the workload required for setting the encryption key increase.

SUMMARY

According to an aspect of an embodiment, a key setting method executed by a node transmitting and receiving a packet through multi-hop communication in an ad-hoc network among ad-hoc networks, includes receiving a packet encrypted using a key specific to a gateway and simultaneously reported from the gateway in the ad-hoc network; detecting a connection with a mobile terminal capable of communicating with a server retaining a key specific to a gateway in each ad-hoc network among the ad-hoc networks; transmitting to the server, via the mobile terminal and when a connection with the mobile terminal is detected, the encrypted packet received; receiving from the server and via the mobile terminal, a key specific to a gateway in the ad-hoc network and for decrypting the encrypted packet transmitted; and setting the received key specific to the gateway in the ad-hoc network as the key for encrypting the packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3 and 4 are sequence diagrams of an operation example of the network system at the time of introduction of a new node;

FIG. 5 is a block diagram of a hardware configuration of a management server according to the embodiment;

FIG. 6 is a block diagram of a hardware configuration of the node, etc. according to the embodiment;

FIG. 7 is an explanatory view of an example of the contents of an encryption key DB;

FIG. 15 is a flowchart of an example of a key setting process procedure of the node;

FIG. 16 is a flowchart of an example of the key providing process procedure of the management server;

FIG. 17 is a flowchart of an example of the key extraction process (part 1) of step S1602; and FIG. 18 is a flowchart of an example of the key extraction process (part 2) of step S1602.

DESCRIPTION OF EMBODIMENTS

Preferred embodiments of the present invention will be explained with reference to the accompanying drawings.

Figure 1:
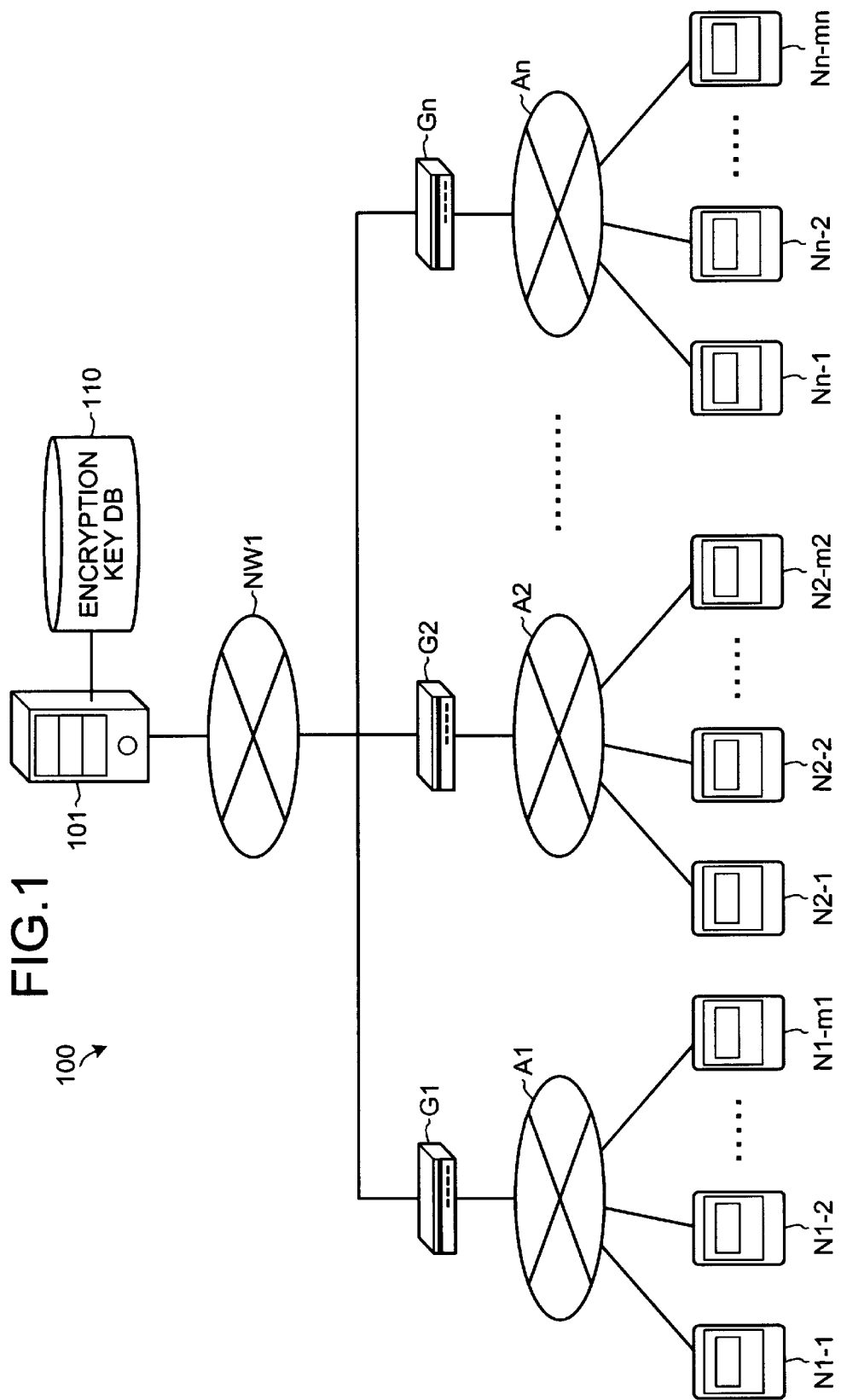
FIG. 1 is an explanatory view of one example of a network system according to an embodiment.

FIG. 1 is an explanatory view of one example of a network system according to the embodiment. In FIG. 1, a network system 100 includes a management server 101, gateways G1 to Gn, and nodes N1-1 to N1-m1, N2-1 to N2-m2, . . . , Nm-1 to Nn-mn.

In the network system 100, the management server 101 and the gateways G1 to Gn are connected in a mutually communicable manner via a network NW1 such as the Internet, a LAN, and a WAN. The gateway Gi and the nodes Ni-1 to Ni-mi are connected via an ad-hoc network Ai (i=1, 2, . . . , n).

The management server 101 is a computer that includes an encryption key database (DB) 110 and managing encryption keys specific to the gateways G1 to Gn. An encryption key (hereinafter referred to as "encryption key Ki") specific to a gateway Gi is key information for encrypting packets transmitted and received between nodes in an ad-hoc network Ai to which the gateway Gi belongs. The encryption key DB 110 will be described in detail with reference to FIG. 7.

The gateway Gi is a relay device connecting the ad-hoc network Ai and the network NW1. The gateway Gi understands both a protocol of the ad-hoc network Ai and a protocol of the network NW1 to transfer communications between the ad-hoc network Ai and the network NW1.

The nodes Ni-1 to Ni-mi are radio communication apparatuses performing multi-hop communication with other nodes within a predetermined communication area. In the ad-hoc network Ai, all the nodes Ni-1 to Ni-mi may not necessarily be directly communicable with the gateway Gi and only a portion of the nodes needs to be communicable with the gateway Gi.

The network system 100 is applicable to a system collecting electricity and gas usages of households, for example. For example, the nodes Ni-1 to Ni-mi are incorporated into electricity meters and gas meters of households to transmit and receive between the nodes in the ad-hoc network Ai, the electricity and gas usages of the households. The electricity and gas usages of the households may be measured by the nodes Ni-1 to Ni-mi or may be acquired by the nodes Ni-1 to Ni-mi from the electricity meters and the gas meters.

The gateway Gi transmits the electricity and gas usages of the households received from the nodes Ni-1 to Ni-mi in the ad-hoc network Ai to servers (e.g., the management server 101) of an electric power company and a gas company via the network NW1. As a result, the electricity and gas usages can be collected without an operator actually going to the sites.

The network system 100 encrypts a packet by using the encryption key Ki specific to the gateway Gi for each of the ad-hoc networks Ai, thereby ensuring secure communication (data confidentiality, prevention of tampering) of the ad-hoc networks Ai. Changing the encryption key Ki for each of the ad-hoc networks Ai reduces risks if the key is compromised.

Although one gateway Gi is disposed in the ad-hoc network Ai in the configuration of the example of FIG. 1, the gateways Gi may be disposed in plural. In this case, the encryption key Ki for encrypting the packets transmitted and received in the ad-hoc network Ai is common among the gateways Gi.

A setting example of the encryption key Ki at the time of introduction of a new node N into the network system 100 depicted in FIG. 1 will be described.

Figure 2:
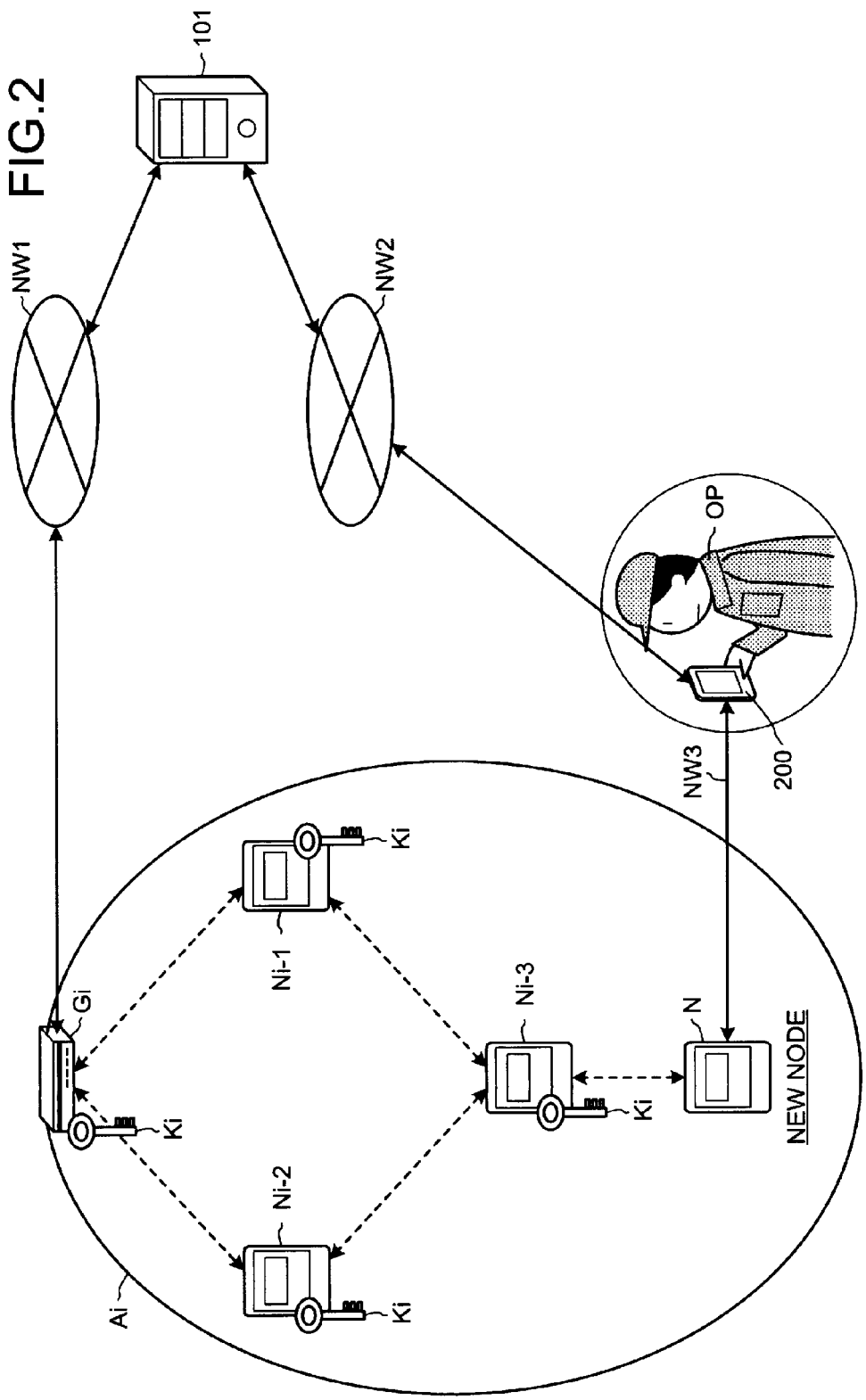
FIG. 2 is an explanatory view of an example of introducing a new node into the network system.

FIG. 2 is an explanatory view of an example of introducing a new node into the network system. In FIG. 2, the new node N is introduced into the ad-hoc network Ai of the network system 100. FIG. 2 depicts the nodes Ni-1 to Ni-3 representative of the nodes Ni-1 to Ni-mi in the ad-hoc network Ai.

At the time of introduction of the new node N, the operator OP does not know to which ad-hoc network Ai the new node N belongs. Therefore, in this embodiment, the mobile terminal 200 used by the operator OP is utilized to make an inquiry to the management server 101 about the encryption key Ki to be set in the new node N, whereby the proper encryption key Ki is acquired from the management server 101 and automatically set in the new node N.

The mobile terminal 200 is a mobile communication apparatus used by the operator OP and is, for example, a mobile telephone, a Personal Handy-phone System (PHS) telephone, a Smartphone, and a notebook personal computer. The mobile terminal 200 relays communication between the node N and the management server 101, which are unable to communicate directly.

FIGS. 3 and 4 are sequence diagrams of an operation example of the network system at the time of introduction of a new node. The sequence of FIG. 3 is an example of operation performed before the operator OP actually goes to a site (location of the new node N), for example. The sequence of FIG. 4 is an example of operation performed after the operator OP goes to the actual site, for example.

In the sequence of FIG. 3, (1) the gateway Gi transmits the encryption key Ki specific to the gateway Gi to the management server 101. (2) The management server 101 correlates and registers the encryption key Ki specific to the gateway Gi and the address of the gateway Gi into the encryption key DB 110.

(3) The gateway Gi broadcasts (simultaneously reports) to the ad-hoc network Ai a packet (hereinafter referred to as an "encrypted packet SPi") encrypted using the encryption key Ki specific to the gateway Gi. The encrypted packet SPi includes the address of the gateway Gi, for example.

(4) The node Ni-1 transmits the encrypted packet SPi from the gateway Gi to the node Ni-3 within communication range. (5) The node Ni-3 transmits the encrypted packet SPi from the node Ni-1 to the new node N within communication range. (6) The new node N records the encrypted packet SPi from the node Ni-3. However, since the encryption key Ki is not set, the new node N cannot decrypt the encrypted packet SPi at this point.

In the sequence diagram of FIG. 4, (7) the mobile terminal 200 connects, via s network NW2 such as mobile telephone network and the Internet, to the management server 101. In this case, the mobile terminal 200 uses, for example, Secure Socket Layer (SSL) to perform secure communication with the management server 101. A communication mode for implementing the secure communication between the management server 101 and the mobile terminal 200 will be described with reference to FIGS. 13 and 14.

(8) The mobile terminal 200 connects, via a wired or wireless network NW3, to the new node N. For example, the operator OP connects the mobile terminal 200 and the new node N by using a Universal Serial Bus (USB) cable to establish the network NW3 between the mobile terminal 200 and the new node N.

(9) The new node N transmits, via the network NW3 and to the mobile terminal 200, the encrypted packet SPi recorded at (6) depicted in FIG. 3. (10) The mobile terminal 200 transmits the encrypted packet SPi from the new node N, via the network NW2, to the management server 101.

(11) The management server 101 extracts from the encryption key DB 110, the encryption key Ki for decrypting the encrypted packet SPi from the mobile terminal 200. For example, the management server 101 extracts from the encryption key DB 110 the encryption key Ki stored and correlated with the address of the gateway Gi included in the encrypted packet SPi.

(12) The management server 101 transmits the extracted encryption key Ki, via the network NW2, to the mobile terminal 200. (13) The mobile terminal 200 transmits the encryption key Ki from the management server 101, via the network NW3, to the new node N. (14) The new node N sets the encryption key Ki from the mobile terminal 200 as the key for decrypting packets.

As described, by using, as a clue, the encrypted packet SPi that can be received from the gateway Gi even if the encryption key Ki for secure communication is not set, the node N can make a key request via the mobile terminal 200 to the management server 101 to acquire the encryption key Ki that is to be set.

In the following description, a "node N" refers to a node transmitting and receiving a packet through multi-hop communication in an ad-hoc network Ai, among the ad-hoc networks A1 to An of the network system 100. "Node, etc." refers to the gateways G1 to Gn of the network system 100 and the node N.

FIG. 5 is a block diagram of a hardware configuration of a management server according to the embodiment. As depicted in FIG. 5, the management server includes a central processing unit (CPU) 501, a read-only memory (ROM) 502, a random access memory (RAM) 503, a magnetic disk drive 504, a magnetic disk 505, an optical disk drive 506, an optical disk 507, an interface (I/F) 508, a display 509, a keyboard 510, and a mouse 511, respectively connected by a bus 500.

The CPU 501 governs overall control of the management server. The ROM 502 stores therein programs such as a boot program. The RAM 503 is used as a work area of the CPU 501. The magnetic disk drive 504, under the control of the CPU 501, controls the reading and writing of data with respect to the magnetic disk 505. The magnetic disk 505 stores therein data written under control of the magnetic disk drive 504.

The optical disk drive 506, under the control of the CPU 501, controls the reading and writing of data with respect to the optical disk 507. The optical disk 507 stores therein data written under the control of the optical disk drive 506, the data being read by a computer.

The I/F 508 is connected to the networks NW1 and NW2 through a communication line and is connected to other apparatuses through the networks NW1 and NW2. The I/F 508 administers an internal interface with the networks NW1 and NW2 and controls the input/output of data from/to external apparatuses. For example, a modem or a LAN adaptor may be employed as the I/F 508.

The display 509 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 509.

The keyboard 510 includes, for example, keys for inputting letters, numerals, and various instructions and performs the input of data. Alternatively, a touch-panel-type input pad or numeric keypad, etc. may be adopted. The mouse 511 is used to move the cursor, select a region, or move and change the size of windows. A track ball or a joy stick may be adopted provided each respectively has a function similar to a pointing device. The mobile terminal 200 depicted in FIG. 2 can also be configured by the same hardware as that of the management server 101 depicted in FIG. 5.

FIG. 6 is a block diagram of a hardware configuration of the node, etc. according to the embodiment. In FIG. 6, the node, etc. include a CPU 601, a RAM 602, a flash memory 603, an I/F 604, and an encryption circuit 605, respectively connected through a bus 600.

The CPU 601 governs overall control of the node, etc. The RAM 602 is used as a work area of the CPU 601. The flash memory 603 stores programs and key information of an encryption key, etc. The I/F 604 transmits and receives packets through multi-hop communication. The I/F 604 of the gateway Gi is connected through a communication line to the network NW1 and is connected via the network NW1 to the management server 101.

The encryption circuit 605 is a circuit that encrypts data using an encryption key if the data is to be encrypted. If the encryption is executed by software, the need for the encryption circuit 605 is eliminated by storing a program corresponding to the encryption circuit 605 into the flash memory 603.

FIG. 7 is an explanatory view of an example of the contents of the encryption key DB. In FIG. 7, the encryption key DB 110 includes fields for IDs, GW addresses, and encryption keys into which information entered to store key information as records 700-1 to 700-$n$ for each of the respective gateways G1 to Gn.

The ID is an identifier of the gateway Gi used for explanation in this description. The GW address is an address of the gateway Gi. For the GW address, for example, a Media Access Control (MAC) address or an Internet protocol (IP) address can be used. The encryption key is an encryption key Ki specific to each gateway Gi and is binary data of about 128 to 256 bits, for example.

Taking the key information 700-1 as an example, the GW address of the gateway Gi is "xx:xx:xx:xx:12:34" and the encryption key is the "encryption key K1". The encryption key DB 110 is implemented by a storage device such as the ROM 502, the RAM 503, the magnetic disk 505, and the optical disk 507 of the management server 101 depicted in FIG. 5, for example.

The contents of the encryption key DB 110 may be updated when the management server 101 receives the encryption key Ki specific to the gateway Gi from the gateway Gi as described in the sequence diagram of FIG. 3. The contents of the encryption key DB 110 may be updated through user input via the keyboard 510 and the mouse 511 depicted in FIG. 5.

Figure 8:
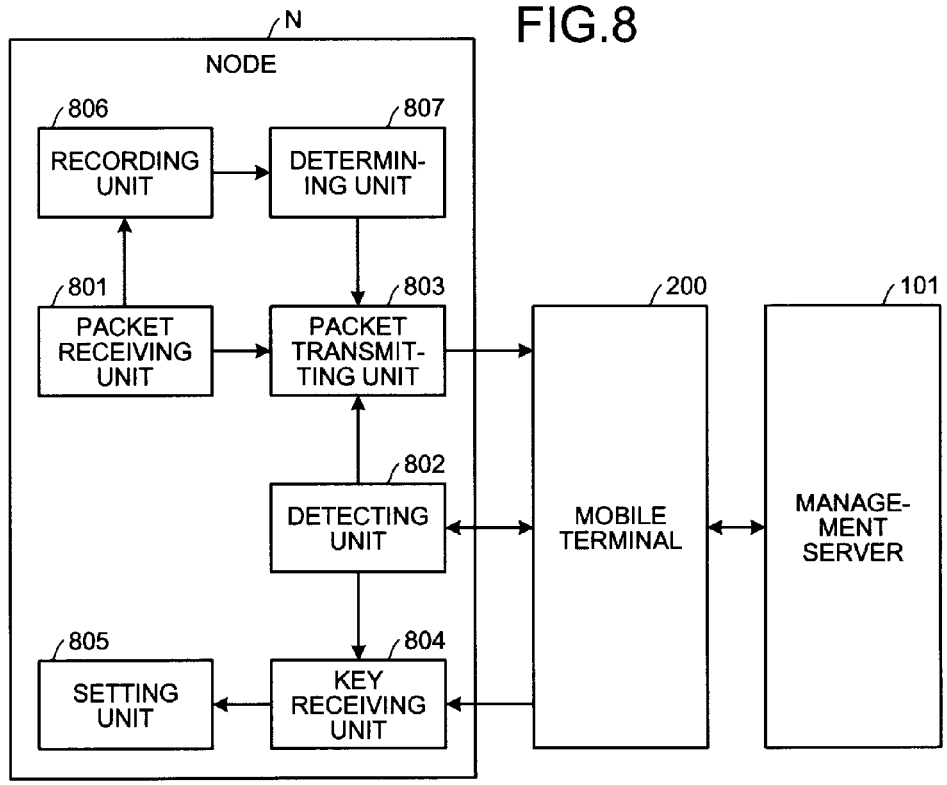
FIG. 8 is a block diagram of a functional configuration of a node.

FIG. 8 is a block diagram of a functional configuration of a node. In FIG. 8, the node N includes a packet receiving unit 801, a detecting unit 802, a packet transmitting unit 803, a key receiving unit 804, a setting unit 805, a recording unit 806, and a determining unit 807. For example, functions of the functional units (the packet receiving unit 801 to the determining unit 807) are implemented by executing on the CPU 601, programs stored in a storage device such as the RAM 602 and the flash memory 603 depicted in FIG. 6 or by the I/F 604. The process results obtained by the functional units (the packet receiving unit 801 to the determining unit 807) are stored in a storage device such as the RAM 602 and the flash memory 603 unless otherwise specified.

The packet receiving unit 801 receives the encrypted packet SPi broadcasted from the gateway Gi in the ad-hoc network Ai. The encrypted packet SPi is a packet that has been encrypted using the encryption key Ki specific to the gateway Gi. This encrypted packet SPi is a packet broadcasted from the gateway Gi for synchronization among nodes, etc., in the ad-hoc network Ai, for example.

For example, the packet receiving unit 801 receives from another node N in the ad-hoc network Ai, the encrypted packet SPi through multi-hop communication. However, if the gateway Gi is within the communication range of the node N, the packet receiving unit 801 may directly receive the encrypted packet SPi from the gateway G1. A data structure of the encrypted packet SPi will be described.

Figure 9:
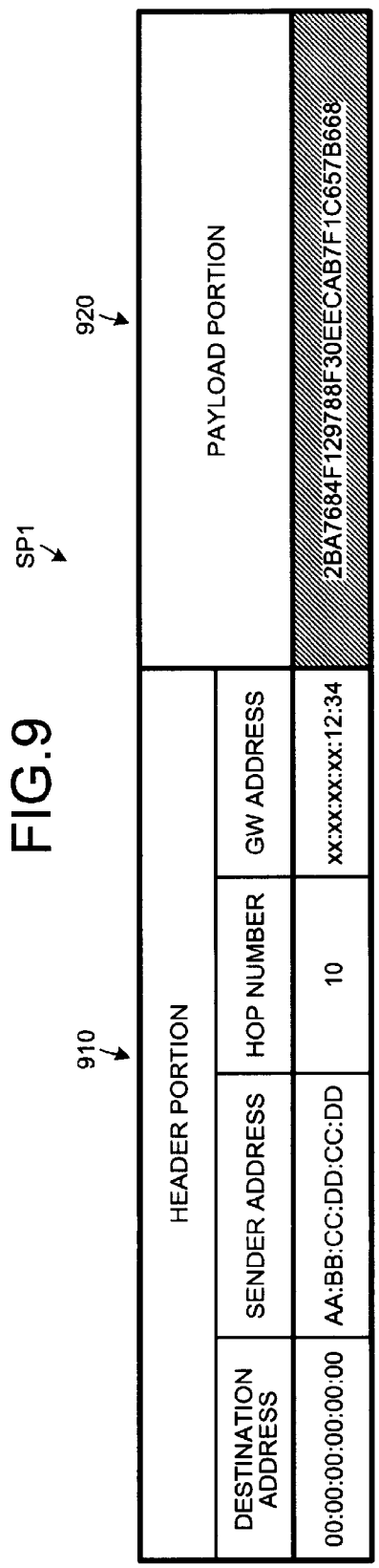
FIG. 9 is an explanatory view (part 1) of an example of a data structure of an encrypted packet.

FIG. 9 is an explanatory view (part 1) of an example of a data structure of the encrypted packet. In FIG. 9, an encrypted packet SP1 includes a header portion 910 and a payload portion 920. A destination address, a sender address, a hop number, and a GW address are described in the header portion 910. An encrypted data body is described in the payload portion 920 (a hatched portion of FIG. 9).

The destination address is the address of a transmission destination. In this example, a MAC address "00:00:00:00:00:00" for broadcasting is described. The sender address is the address of a transmission source. In this example, a MAC address of another node N different from the node N in the ad-hoc network A1 is described.

The hop number is the remaining number of transfers indicative of how many times the encrypted packet SPi will be transferred. The maximum value of the hop number of the encrypted packet SPi broadcasted from the gateway Gi is set in advance. The hop number is decremented at the time of transfer of the encrypted packet SPi and the encrypted packet SPi having the hop number turned to "0" is discarded. In this example, the hop number "10" of the encrypted packet SPi is described.

The GW address is an address of the gateway Gi. In this example, the MAC address "xx:xx:xx:xx:12:34" of the gateway Gi is described. Although the MAC addresses are used as examples of the destination address, the sender address, and the GW address in this description, addresses such as Internet Protocol addresses may also be used.

The reference of description returns to FIG. 8. In FIG. 8, the detecting unit 802 detects connection with the mobile terminal 200 communicable with the management server 101. For example, the operator OP connects the mobile terminal 200 and the node N by using an USB cable and, as a result, the detecting unit 802 detects the connection via the USB cable with the mobile terminal 200.

When the connection with the mobile terminal 200 is detected, the packet transmitting unit 803 transmits the received encrypted packet SPi via the mobile terminal 200 to the management server 101. For example, the packet transmitting unit 803 transmits the encrypted packet SPi via the network NW3, e.g. a USB cable, to the mobile terminal 200. As a result, the mobile terminal 200 transmits the encrypted packet SPi from the node N via the network NW2 to the management server 101.

The key receiving unit 804 receives, via the mobile terminal 200 and from the management server 101, the encryption key Ki specific to the gateway Gi for decrypting the transmitted encrypted packet SPi. This encryption key Ki is, for example, a common key capable of encrypting a packet and decrypting an encrypted packet SPi encrypted using the encryption key Ki.

The setting unit 805 sets the received encryption key Ki specific to the gateway Gi as the key for encrypting packets. As a result, the node N can subsequently encrypt packets to be transmitted, decrypt encrypted packets, and can perform secure communication between the nodes in the ad-hoc network Ai.

The recording unit 806 records information related to the received encrypted packet SPi. For example, the recording unit 806 records the hop number and the GW address included in the header portion 910 of the encrypted packet SP1 depicted in FIG. 9 into a packet information table 1000. The packet information table 1000 will be described. The packet information table 1000 is implemented by a storage device such as the RAM 602 and the flash memory 603, for example.

Figures 10, 11:
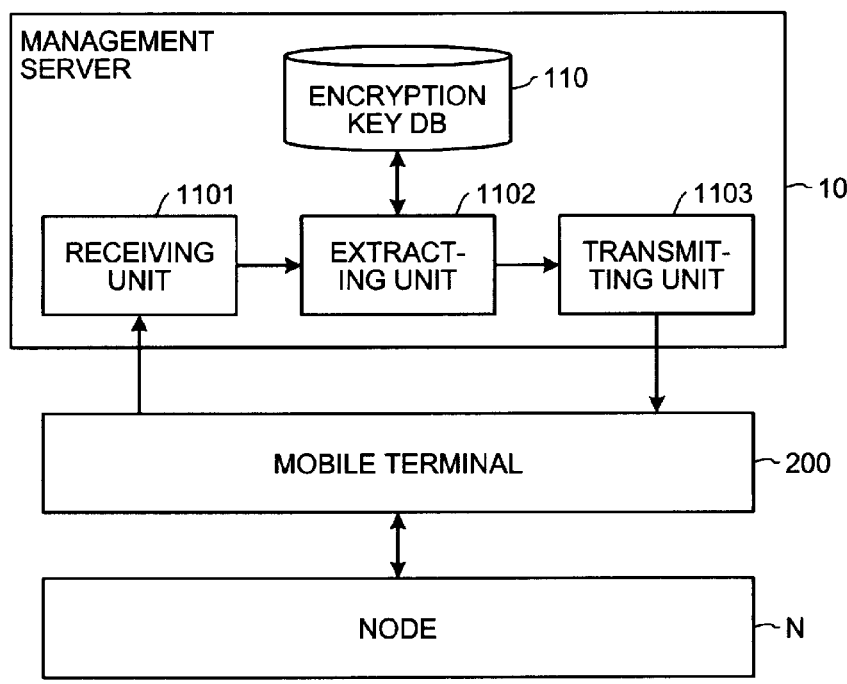
FIG. 10 is an explanatory view of an example of the contents of a packet information table.
FIG. 11 is a block diagram of a functional configuration of the management server.

FIG. 10 is an explanatory view of an example of the contents of the packet information table. In FIG. 10, the packet information table 1000 includes fields for IDs, hop numbers, and GW addresses, and information is entered into each field to store packet information as records 1000-1 to 1000-5.

The IDs are identifiers of the encrypted packets SPi used for explanation in this description. The hop numbers are the remaining number of transfers indicative of how many times the encrypted packets SPi will be transferred. The GW addresses are addresses of the gateways Gi. The packet information records for the encrypted packets SPi are stored in the packet information table 1000 in the order of reception of the encrypted packets SPi.

Returning to the description of FIG. 8, if multiple encrypted packets SPi are received, the determining unit 807 determines the encrypted packet SPi to be transmitted, based on the information of the recorded encrypted packets SPi. For example, if the location of the node N is at a position where the ad-hoc networks A1 and A2 overlap with each other, the packet receiving unit 801 may receive encrypted packets SP1 and SP2 from the different gateways G1 and G2.

In this case, to determine the proper gateway Gi to which the node N should belong, the encrypted packet SPi to be transmitted to the management server 101 is determined based on the information related to the encrypted packets SPi recorded by the recording unit 806. The packet transmitting unit 803 transmits the determined encrypted packet SPi, via the mobile terminal 200, to the management server 101. An example of determination of the encrypted packet SPi to be transmitted will hereinafter be described with reference to FIG. 10.

For example, the determining unit 807 may refer to the packet information table 1000 and determine the oldest encrypted packet SPi as a packet to be transmitted. In the example of FIG. 10, the determining unit 807 determines the encrypted packet SP1 identified from the oldest packet information record 1000-1 as the packet to be transmitted. As a result, the first encrypted packet SPi received by the node N can be defined as the packet to be transmitted.

For example, the determining unit 807 may refer to the packet information table 1000 and determine the latest encrypted packet SPi as a packet to be transmitted. In the example of FIG. 10, the determining unit 807 determines the encrypted packet SP1 identified from the latest packet information record 1000-5 as the packet to be transmitted. As a result, the late encrypted packet SPi received by the node N can be defined as the packet to be transmitted. Consequently, for example, if a gateway located closer than existing gateways is newly disposed, an encryption key specific to the newly disposed gateway can be acquired.

For example, the determining unit 807 may refer to the packet information table 1000 and determine the encrypted packet SPi having the largest hop number as a packet to be transmitted. In the example of FIG. 10, the determining unit 807 determines the encrypted packet SP1 identified from the packet information record 1000-1 as the packet to be transmitted. As a result, the encrypted packet SPi having the smallest number of times of transfer can be defined as the packet to be transmitted.

If the encrypted packet SPi has fewer transfers, the gateway Gi is likely to be at a closer position geographically. Therefore, by defining the encrypted packet SPi having fewest transfers as the packet to be transmitted, the encryption key Ki specific to a closer gateway Gi can consequently be acquired and the efficiency of communication with the gateway Gi can be improved.

For example, the determining unit 807 may determine the encrypted packet SPi to be transmitted, based on the average values of the hop numbers of the respective gateways Gi by referring to the packet information table 1000. For example, the determining unit 807 refers to the packet information table 1000 to calculate the average values of the hop numbers of the respective gateways Gi.

In the example of FIG. 10, the average value of the hop number of the GW address "xx:xx:xx:xx:12:34" is "6=(10+ 7+1)/3". The average value of the hop number of the GW address "xx:xx:xx:xx:56:78" is "7=(8+6)/2". In this case, the determining unit 807 determines, as the packet to be transmitted, the encrypted packet SP2 broadcasted from the gateway G2 of the GW address "xx:xx:xx:xx:56:78" and having the largest average hop number, for example. As a result, the encrypted packet SPi statistically having the fewest transfers can be defined as the packet to be transmitted.

FIG. 11 is a block diagram of a functional configuration of the management server. In FIG. 11, the management server 101 includes a receiving unit 1101, an extracting unit 1102, and a transmitting unit 1203. For example, functions of the functional units (the receiving unit 1101 to the transmitting unit 1103) are implemented by executing on the CPU 501, programs stored in a storage device such as the ROM 502, the RAM 503, the magnetic disk 505, and the optical disk 507 depicted in FIG. 5 or by the I/F 508. The process results obtained by the functional units (the receiving unit 1101 to the transmitting unit 1103) are stored in a storage device such as the RAM 503, the magnetic disk 505, and the optical disk 507, for example.

The receiving unit 1101 receives the encrypted packet SPi via the mobile terminal 200 from the node N. For example, the receiving unit 1101 receives the encrypted packet SPi from the node N, via the network NW2 from the mobile terminal 200.

The extracting unit 1102 extracts from the encryption key DB 110, the encryption key Ki for decrypting the received encrypted packet SPi. For example, the extracting unit 1102 extracts from the encryption key DB 110, the encryption key K1 stored and correlated with the address of the gateway Gi included in the encrypted packet SPi.

It is assumed that the receiving unit 1101 receives the encrypted packet SP1 depicted in FIG. 9. In this case, for example, the extracting unit 1102 extracts from the encryption key DB 110, the encryption key Ki stored and correlated with the GW address "xx:xx:xx:xx:12:34" included in the encrypted packet SP1.

The transmitting unit 1103 transmits the extracted encryption key Ki, via the mobile terminal 200, to the node N. For example, the transmitting unit 1103 transmits the extracted encryption key K1, via the network NW2, to the mobile terminal 200. As a result, the mobile terminal 200 transmits to the node N and via the network NW3, the encryption key K1 from the management server 101.

If a GW address is included in the header portion 910 as in a case of the encrypted packet SP1 depicted in FIG. 9, the encryption key Ki can be extracted from the encryption key DB 110 by using the GW address as a clue as described above. On the other hand, a GW address may be included in a payload portion 1220 as in a case of the encrypted packet SP1 depicted in FIG. 12.

Figure 12:
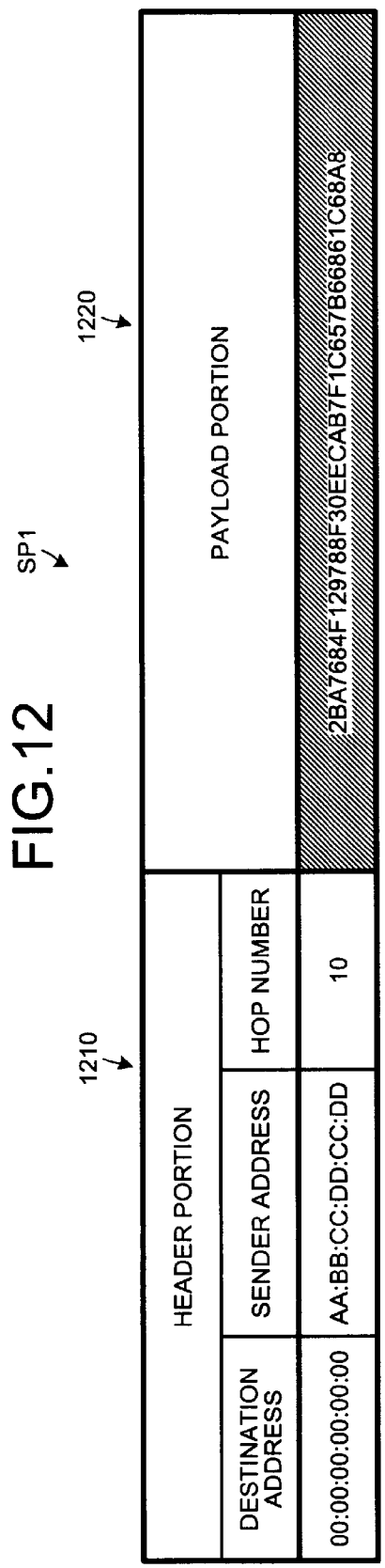
FIG. 12 is an explanatory view (part 2) of an example of a data structure of an encrypted packet.

FIG. 12 is an explanatory view (part 2) of an example of a data structure of the encrypted packet. In FIG. 12, the encrypted packet SP1 includes a header portion 1210 and the payload portion 1220. A destination address, a sender address, and a hop number are described in the header portion 1210. An encrypted GW address and a data body are described in the payload portion 1220 (hatched portion of FIG. 12).

In this case, the encryption key Ki cannot be extracted from the encryption key DB 110 by using the GW address as a clue. Therefore, the extracting unit 1102 executes a decryption process of the encrypted packet SPi by using each encryption key Ki registered in the encryption key DB 110 and extracting the encryption key Ki that successfully decrypts the encrypted packet SPi.

Whether the decryption is successful can be determined based on the format of the packet decrypted from the encrypted packet SPi. For example, if the decrypted packet acquired by decrypting the encrypted packet SPi is data in a format prescribed in advance, the extracting unit 1102 determines that the decryption of the encrypted packet SPi is successful. Therefore, if the GW address is not included in the header portion 1210 of the encrypted packet SPi, the proper encryption key Ki to be set in the node N can be extracted from the encryption key DB 110.

Although it is assumed that the encryption key Ki specific to the gateway Gi is already registered in the encryption key DB 110 when the management server 101 receives the encrypted packet SPi in the description, configuration is not limited hereto. For example, after receiving the encrypted packet SPi, the management server 101 may make an inquiry to the gateway Gi to acquire the encryption key Ki specific to the gateway Gi, thereby eliminating the need of the management server 101 to preliminarily retain the encryption keys K1 to Kn specific to each of the gateways G1 to Gn in the network system 100.

One example of a communication mode between the management server 101 and the mobile terminal 200 will be described. First, server authentication of the management server 101 from the viewpoint of the mobile terminal 200 will be described. For example, first, the mobile terminal 200 uses a predetermined IP address to connect to the management server 101.

The mobile terminal 200 receives an SSL server certificate from the management server 101. The received SSL server certificate is correlated with the IP address of the management server 101 and stored into a storage device such as the RAM 602 and the flash memory 603 of the mobile terminal 200 as depicted in FIG. 13, for example.

Figure 13:
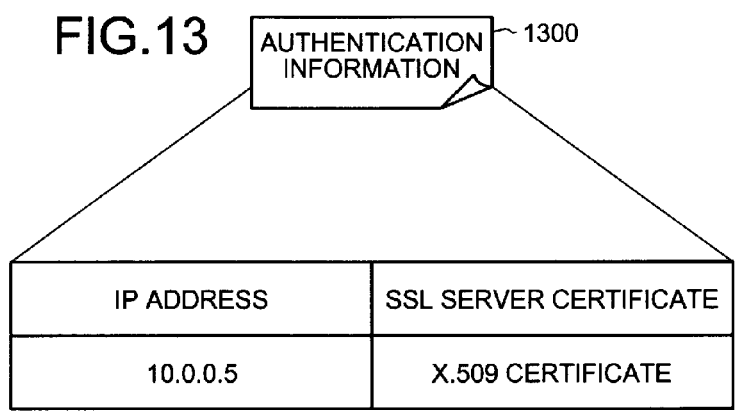
FIG. 13 is an explanatory view of an example of authentication information for the management server.

FIG. 13 is an explanatory view of an example of authentication information for the management server. In FIG. 13, authentication information 1300 for the management server 101 includes an IP address and an SSL server certificate. The IP address is the IP address of the management server 101. The X.509 certificate is the SSL server certificate (public key certificate) of the management server 101.

The mobile terminal 200 decrypts the SSL server certificate using a public key preliminarily set in the mobile terminal 200 and performs the server authentication. The public key is a key issued by a third-party certifier, for example. If the SSL server certificate can be decrypted correctly using this public key, the SSL server certificate is a proper certificate certified by the third-party certifier and therefore, the identity of the management server 101 is certified.

Figure 14:
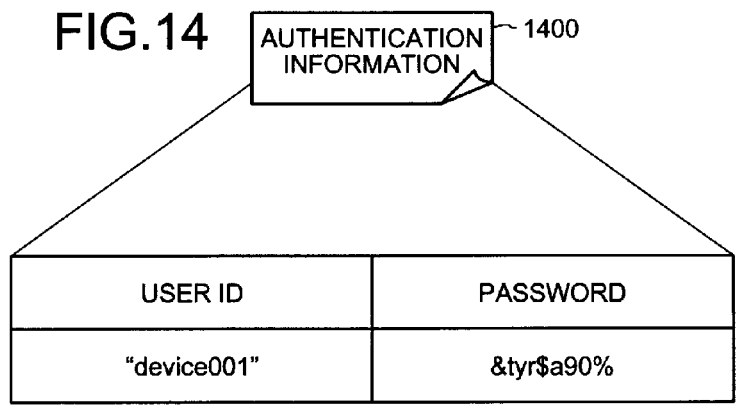
FIG. 14 is an explanatory view of an example of authentication information of a mobile terminal.

The user authentication of the mobile terminal 200 from the viewpoint of the management server 101 will be described. The case of performing the user authentication of the mobile terminal 200 using authentication information 1400 of the mobile terminal 200 as depicted in FIG. 14 will be taken as an example in this description. The authentication information 1400 is stored in a storage device such as the ROM 502, the RAM 503, the magnetic disk 505, and the optical disk 507 of the management server 101, for example.

FIG. 14 is an explanatory view of an example of authentication information of the mobile terminal. In FIG. 14, the authentication information 1400 of the mobile terminal 200 has a user ID and a password. The user ID is the identifier of the mobile terminal 200. The password is for authenticating the user of the mobile terminal 200.

For example, first, the mobile terminal 200 transmits a paired user ID and password to the management server 101. The user ID and the password may be registered in advance in the flash memory 603 of the mobile terminal 200 or may be input by the user via an input device (not depicted) of the mobile terminal 200.

Subsequently, the management server 101 determines whether the paired user ID and password from the mobile terminal 200 matches a paired user ID and password in the authentication information 1400. If the paired user ID and password match a paired user ID and password in the authentication information 1400, the identity of the user of the mobile terminal 200 is certified.

After the authentication, for example, the mobile terminal 200 encrypts a packet using the public key included in the SSL server certificate of the management server 101 to communicate with the management server 101. As a result, secure communication can be performed between the management server 101 and the mobile terminal 200.

FIG. 15 is a flowchart of an example of a key setting process procedure of the node. In the flowchart of FIG. 15, first, the node N determines whether the packet receiving unit 801 has received an encrypted packet SPi broadcasted from the gateway Gi in the ad-hoc network Ai (step S1501).

Receipt of an encrypted packet SPi is awaited (step S1501: NO) and upon receipt (step S1501: YES), the node N determines whether the detecting unit 802 has detected a connection with the mobile terminal 200 communicable with the management server 101 (step S1502).

Detection of a connection with the mobile terminal 200 is awaited (step S1502: NO) and upon detection (step S1502: YES), the packet transmitting unit 803 transmits the received encrypted packet SPi via the mobile terminal 200 to the management server 101 (step S1503).

The node N determines whether the key receiving unit 804 has received from the management server 101, via the mobile terminal 200, the encryption key Ki specific to the gateway Gi for decrypting the transmitted encrypted packet SPi (step S1504).

Receipt of the encryption key Ki is awaited (step S1504: NO) and upon receipt (step S1504: YES), the setting unit 805 sets the received encryption key Ki specific to the gateway Gi as a key for encrypting a packet (step S1505), and a series of the processes of this flowchart ends.

As a result, the encryption key Ki specific to the gateway Gi for decrypting the encrypted packet SPi can be acquired from the management server 101 and set.

FIG. 16 is a flowchart of an example of the key providing process procedure of the management server. In the flowchart of FIG. 16, the management server 101 determines whether the receiving unit 1101 has received from the node N, the encrypted packet SPi via the mobile terminal 200 (step S1601).

Receipt of the encrypted packet SPi is awaited (step S1601: NO) and upon receipt (step S1601: YES), the extracting unit 1102 executes a key extraction process of extracting the encryption key Ki from the encryption key DB 110 (step S1602). The transmitting unit 1103 transmits the extracted encryption key Ki to the node N, via the mobile terminal 200 (step S1603), and a series of the processes of this flowchart ends.

As a result, the node N can be provided with the encryption key Ki specific to the gateway Gi in the ad-hoc network Ai to which the node N belongs.

A process procedure of the key extraction process (part 1) of step S1602 depicted in FIG. 16 will be described. The key extraction process (part 1) of the following description is a process when the GW address included in the encrypted packet SPi is not encrypted.

FIG. 17 is a flowchart of an example of the key extraction process (part 1) of step S1602. In the flowchart of FIG. 17, first, the extracting unit 1102 identifies the GW address included in the encrypted packet SPi received at step S1601 depicted in FIG. 16 (step S1701).

The extracting unit 1102 initializes "i" of the gateway Gi to "i=1" (step S1702). The extracting unit 1102 subsequently refers to the encryption key DB 110 and identifies the GW address of the gateway Gi (step S1703). The extracting unit 1102 determines whether the GW address identified at step S1701 matches the GW address identified at step S1703 (step S1704).

If the GW addresses match (step S1704: YES), the extracting unit 1102 extracts the encryption key Ki from the encryption key DB 110 (step S1705) and the management server 101 proceeds to step S1603 depicted in FIG. 16. On the other hand, if the GW addresses do not match (step S1704: NO), the extracting unit 1102 increments "i" of the gateway Gi (step S1706) and determines whether "i" is greater than "n" (step S1707).

If "i" is less than or equal to "n" (step S1707: NO), the management server 101 returns to step S1703. If "i" is greater than "n" (step S1707: YES), the extracting unit 1102 executes an error process (step S1708), and a series of the processes of the management server 101 ends.

As a result, the encryption key Ki for decrypting the received encrypted packet SPi can be extracted from the encryption key DB 110. In the error process of step S1708, for example, the extracting unit 1102 may transmit an error message indicating that the encryption key Ki for decrypting the encrypted packet SPi cannot be extracted.

The error process of step S1708 is executed when the encrypted packet SPi has been tampered with or when a portion of the encrypted packet SPi is missing, for example. This error process can prompt retransmission of the encrypted packet SPi by the node N.

A process procedure of the key extraction process (part 2) of step S1602 depicted in FIG. 16 will be described. The key extraction process (part 2) of the following description is a process when the GW address included in the encrypted packet SPi is encrypted.

FIG. 18 is a flowchart of an example of the key extraction process (part 2) of step S1602. In the flowchart of FIG. 18, first, the extracting unit 1102 initializes "i" of the gateway Gi to "i=1" (step S1801). The extracting unit 1102 uses the encryption key Ki specific to the gateway Gi in the encryption key DB 110 to decrypt the encrypted packet SPi received at step S1601 depicted in FIG. 16 (step S1802).

The extracting unit 1102 determines whether the decryption of the encrypted packet SPi is successful (step S1803). If the decryption of the encrypted packet SPi is successful (step S1803: YES), the extracting unit 1102 extracts the encryption key Ki from the encryption key DB 110 (step S1804) and the management server 101 proceeds to step S1603 depicted in FIG. 16.

On the other hand, if decryption of the encrypted packet SPi has failed (step S1803: NO), the extracting unit 1102 increments "i" of the gateway Gi (step S1805) and determines whether "i" is greater than "n" (step S1806).

If "i" is less than or equal to "n" (step S1806: NO), the procedure returns to step S1802. If "i" is greater than "n" (step S1806: YES), the extracting unit 1102 executes an error process (step S1807), and a series of the processes of the management server 101 is terminated.

As a result, even if the GW address is not included in the header portion 1210 of the encrypted packet SPi, the encryption key Ki for decrypting the received encrypted packet SPi can be extracted from the encryption key DB 110.

As described, according to the embodiment, the node N in the ad-hoc network Ai can transmit to the management server 101, via the mobile terminal 200, the encrypted packet SPi broadcasted from the gateway Gi. As a result, via the mobile terminal 200, the node N can receive and set the encryption key Ki from the management server 101 and specific to the gateway Gi for decrypting the encrypted packet SPi.

As described, by using, as a clue, the encrypted packet SPi that can be received from the gateway Gi even if the encryption key Ki for secure communication is not set, the node N can make a key request via the mobile terminal 200 to the management server 101 to acquire the encryption key Ki to be set. As a result, when the node N is initially introduced, the operator OP does not have to perform work such as thoroughly confirming communication statuses between geographically narrowed-down candidate gateways and the node N, and the efficiency of setting the encryption key Ki for the node N can be increased. Since it is not necessary to record the encryption keys of the candidate gateways in the mobile terminal 200, etc. for confirmation, the risk of information leaks can be reduced when the mobile terminal 200 is transported.

According to the embodiment, if encrypted packets SPi broadcasted from different gateways Gi are received, the node N can determine the encrypted packet SPi to be transmitted, based on the number of transfers of the respective encrypted packets SPi. As a result, even if the location of the node N is at a place where different ad-hoc networks overlap, the proper encryption key Ki to be set in the node N can be provided.

According to the embodiment, the management server 101 can extract from the encryption key DB 110, the encryption key Ki stored and correlated with the address of the gateway Gi included in the encrypted packet SPi. The management server 101 can transmit the encryption key Ki, via the mobile terminal 200, to the node N and thereby provide to the node N, the encryption key Ki specific to the gateway Gi in the ad-hoc network Ai to which the node N belongs.

As described, the key setting method, the node, and the network system according to the embodiment can reduce the workloads of operators involved in the setting of encryption keys for nodes in ad-hoc networks and shorten the work hours of the operators.

The key setting method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The key setting method, the node, and the network system effect improved efficiency in the setting of an encryption key used by the nodes in the ad-hoc network.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A key setting method executed by a node that transmits and receives a packet through multi-hop communication in an ad-hoc network among a plurality of ad-hoc networks, the key setting method comprising:
   receiving a packet encrypted using a key specific to a gateway and broadcasted from the gateway in the ad-hoc network;
   detecting a connection with a mobile terminal capable of communicating with a server retaining a key specific to a gateway in each ad-hoc network among the ad-hoc networks;
   transmitting to the server, via the mobile terminal and when a connection with the mobile terminal is detected, the encrypted packet received;
   receiving from the server and via the mobile terminal, a key specific to a gateway in the ad-hoc network and for decrypting the encrypted packet transmitted; and
   setting the received key specific to the gateway in the ad-hoc network as the key for encrypting the packet.

2. The key setting method according to claim 1, wherein the receiving includes receiving, from the server, a key stored in the database in the server and correlated with the address of the gateway in the an ad-hoc network, included in the encrypted packet.

3. The key setting method according to claim 1, further comprising:
   recording a number of transfers of the encrypted packet received, and
   determining based on the number transfers of each encrypted packet recorded at the recording and when a plurality of the encrypted packets is received at the receiving, an encrypted packet to be transmitted among the encrypted packets received, wherein
   the transmitting includes transmitting to the server, the encrypted packet determined to be transmitted at the determining.

4. A node that transmits and receives a packet through multi-hop communication in an ad-hoc network among a plurality of ad-hoc networks, the node comprising a processor;
   the processor is configured to:
   receive a packet encrypted using a key specific to a gateway and simultaneously reported from the gateway in the ad-hoc network;
   detect a connection with a mobile terminal capable of communicating with a server retaining a key specific to a gateway in each ad-hoc network among the ad-hoc networks;
   transmit to the server, via the mobile terminal and upon detecting a connection with the mobile terminal, the encrypted packet received;

receive from the server and via the mobile terminal, a key specific to a gateway in the ad-hoc network and for decrypting the encrypted packet transmitted; and set the received key specific to the gateway in the ad-hoc network as the key for encrypting the packet.

5. The node according to claim 4, wherein the first receiver configured to receive, from the server, a key stored in a database in the server and correlated with the address of the gateway in the ad-hoc network, included in the encrypted packet.

6. The node according to claim 4, further comprising:

a recording unit configured to record a number of transfers of the encrypted packet received, and a determining unit configured to determine based on the number transfers of each encrypted packet recorded and upon receiving a plurality of the encrypted packets, an encrypted packet to be transmitted among the encrypted packets received, wherein the transmitter configured to transmits to the server, the encrypted packet determined to be transmitted.

7. A network system comprising:

a server that accesses a database storing a key specific to a gateway in each ad-hoc network among a plurality of ad-hoc networks, the server comprising a second processor; and a node that transmits and receives a packet through multi-hop communication in an ad-hoc network among the ad-hoc networks, the node comprising a first processor, wherein the first processor is configured to:

receive a packet encrypted using a key specific to a gateway and broadcasted from the gateway in the ad-hoc network, detect a connection with a mobile terminal capable of communicating with the server, transmit, via the mobile terminal and to the server upon detecting a connection with the mobile terminal, the encrypted packet received, receive from the server and via the mobile terminal, a key specific to a gateway in the ad-hoc network and for decrypting the encrypted packet transmitted, and set the received key specific to the gateway in the ad-hoc network as the key for encrypting the packet, the second processor is configured to:

receive from the node and via the mobile terminal, the encrypted packet, extract from the database, the key for decrypting the encrypted packet received, and transmit to the node and via the mobile terminal, the key for decrypting the encrypted packet extracted.

* * * * *